(12) United States Patent
Kobayashi et al.

(10) Patent No.: US 6,529,611 B2
(45) Date of Patent: Mar. 4, 2003

(54) MULTIFUNCTION ACOUSTIC DEVICE

(75) Inventors: Takashi Kobayashi, Yamanashi-ken (JP); Akira Yoneyama, Yamanashi-ken (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 0 days.

(21) Appl. No.: 09/996,751

(22) Filed: Nov. 30, 2001

(65) Prior Publication Data
US 2002/0076077 A1 Jun. 20, 2002

(30) Foreign Application Priority Data

Dec. 15, 2000 (JP) ........................................ 2000-381148

(51) Int. Cl.$^7$ .............................................. H04R 25/00
(52) U.S. Cl. ........................ 381/396; 381/412; 381/420
(58) Field of Search ................................. 381/396, 151, 381/412, 419, 420, FOR 159; 340/388.1, 311.1

(56) References Cited

U.S. PATENT DOCUMENTS 5,861,686 A * 1/1999 Lee ............................ 381/396
6,208,237 B1 * 3/2001 Saiki et al. .................. 381/396

* cited by examiner

Primary Examiner—Huyen Le
(74) Attorney, Agent, or Firm—Dennison, Schultz & Dougherty

(57) ABSTRACT

A diaphragm is mounted in a cover for producing sounds, a vibrating assembly including a pole piece is resiliently mounted in the cover so as to be vibrated. A receiving portion is formed on the pole piece of the vibrating assembly for receiving a mass adjusting adhesive, so that the vibration frequency of the vibrating assembly is adjusted to a predetermined frequency.

5 Claims, 3 Drawing Sheets

MULTIFUNCTION ACOUSTIC DEVICE

BACKGROUND OF THE INVENTION

The present invention relates to a multifunction acoustic device used in a portable instrument such as a portable telephone.

There has been provided an acoustic device of the portable instrument in which a speaker is provided for generating sounds of calling signals, and a vibrating device is provided for informing the receiver of calling signals without generating sounds. In such a device, since both of the speaker and the vibrating device are mounted in the acoustic device, the device is increased in size and weight, and in manufacturing cost.

In recent years, there is proposed a multifunction acoustic device in order to remove the above described disadvantages. The multifunction acoustic device comprises a speaker having a vibrating plate and a permanent magnet magnetically connected to a voice coil mounted on the vibrating plate of the speaker. The vibrating plate is vibrated at a high frequency of several 100 Hz to several KHz to produce sounds. The permanent magnet is independently vibrated at a low frequency of 10–100 Hz so as to inform the receiving of calling signals by the vibration of the case of the device, which is transmitted to the body of the user of the device.

FIG. 6 is a sectional view of a multifunction acoustic device disclosed in Japanese Utility Model Publication No. 2549375. The device comprises a spring plate 17 secured to a case 18, a pole piece 19 securely mounted on the spring plate 17 at the central portion of the spring plate, and a permanent magnet 20 mounted on the bottom of the case 18, surrounding the pole piece 19. An exciting coil 21 is secured to the permanent magnet 20 around the pole piece 19.

A diaphragm 16 is secured to the periphery of the case 18, and an armature 15 is fixed to the underside of the diaphragm 16. Thus, a magnetic circuit is formed by the pole piece 19, armature 15 and permanent magnet 20.

When a signal current of 2.1 KHz or 2.7 KHz is applied to the exciting coil 21, the diaphragm 16 is vibrated to produce sounds. When a current of 130 Hz is applied to the coil 21, the pole piece 19 is vibrated to vibrate the case, thereby informing a calling signal.

By properly setting the difference between compliances of the diaphragm 16 and the spring plate 17, the sounds and the oscillation frequency of the pole piece 19 can be changed.

In such a multifunction acoustic device, if there are variances in dimensional accuracy of manufactured devices, the vibration characteristic varies with the devices. In order to remove such a variance, it is necessary to increase the accuracy of products, which causes the manufacturing cost to increase.

In addition, it is difficult to manufacture devices so as to each have a desired vibration frequency, thereby reducing the yield of products.

SUMMARY OF THE INVENTION

An object of the present invention is to provide a multifunction acoustic device which may be manufactured so as to have a predetermined vibration frequency.

According to the present invention, there is provided a multifunction acoustic device comprising a cover, a diaphragm mounted in the cover for producing sounds, a vibrating assembly including a pole piece resiliently mounted in the cover so as to be vibrated, a voice coil provided for vibrating the diaphragm, a receiving portion formed on the vibrating assembly for receiving a mass adjusting material.

The receiving portion is a recess formed in the pole piece.

The recess is formed in the underside of the pole piece, and the cover has an opening corresponding to the recess.

These and other objects and features of the present invention will become more apparent from the following detailed description with reference to the accompanying drawings.

DETAILED DESCRIPTION OF THE PREFERRED EMBODIMENT

Figure 1:
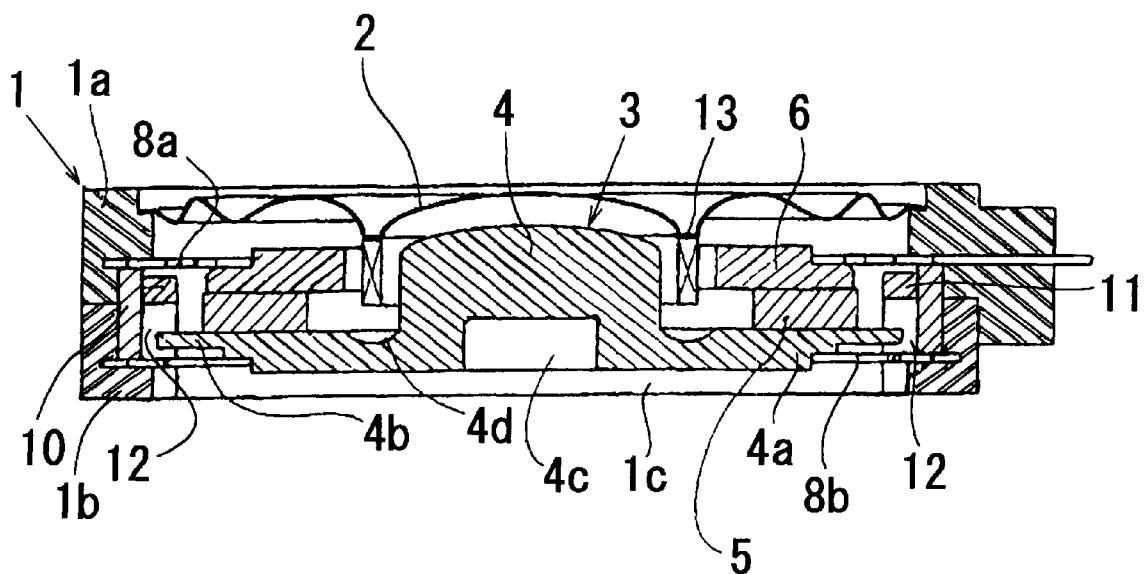
FIG. 1 is a sectional view of a multifunction acoustic device of the present invention.
Figure 2:
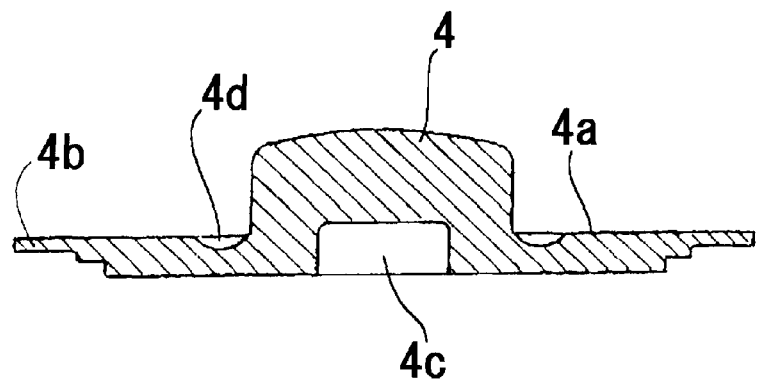
FIG. 2 is a sectional view showing a pole piece.

Referring to FIG. 1 showing a multifunction acoustic device of the present invention, a cover 1 is made of plastic and comprises an upper cover 1a and a lower cover 1b. The lower cover 1b has a large opening 1c at the bottom thereof. The acoustic device comprises a diaphragm 2 and a vibrating assembly 3. The vibrating assembly 3 comprises a cylindrical pole piece 4, a permanent magnet 5 and a top plate 6.

Figure 3:
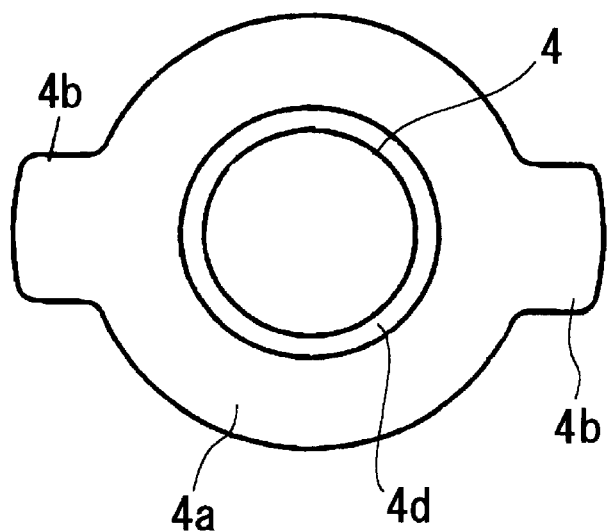
FIG. 3 is a plan view showing the pole piece.

As shown in FIG. 3, the pole piece 4 has a circular supporting plate 4a and a pair of stopper projections 4b. A recess 4c is formed in the underside of the pole piece for receiving a mass adjusting material such as an adhesive or weight. The pole piece 4, supporting plate 4a and projections 4b are integral with each other and are made by a material having a high permeability. The permanent magnet 5 has an annular shape and is secured to the supporting plate 4a. The top plate 6 has also an annular shape and is made of a material having a high permeability and secured to the permanent magnet around the cylindrical pole piece 4. Thus, the vibrating assembly 3 is composed.

Figure 4:
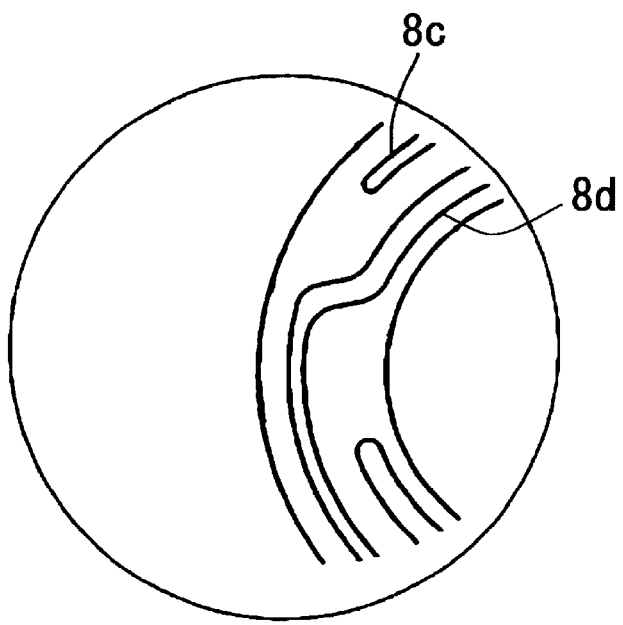
FIG. 4 is an enlarged plan view showing a part of a suspension spring.

On the other hand, an upper suspension spring 8a and a lower suspension spring 8b are embedded in the upper and lower covers 1a and 1b by insert molding. As shown in FIG. 4, each of the suspension springs 8a and 8b has an annular shape and a pair of annular grooves 8c and 8d so as to provide a resiliency of the plate.

Figure 5:
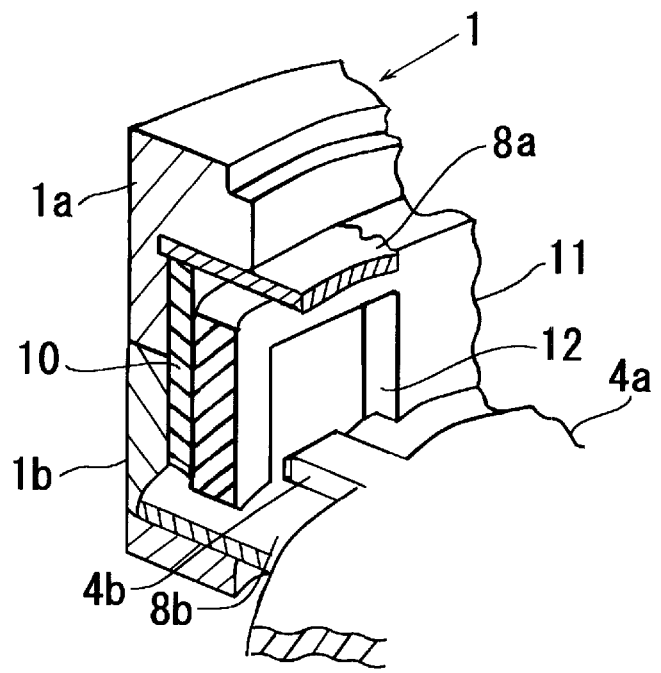
FIG. 5 is a perspective view showing a part of the acoustic device of the present invention.
Figure 6:
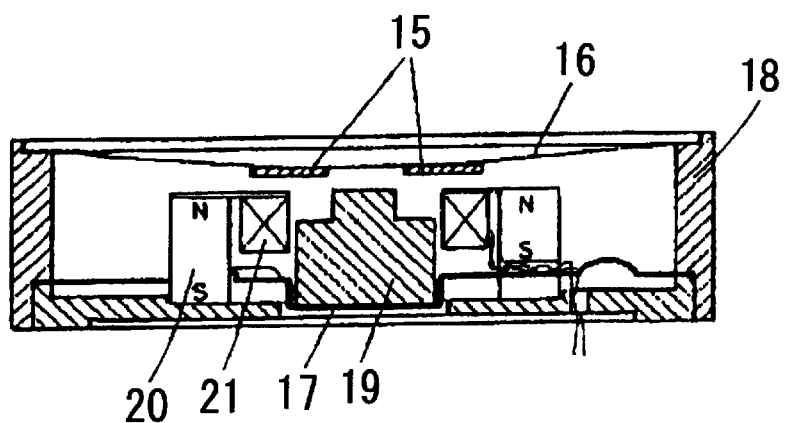
FIG. 6 is a sectional view of a conventional multifunction acoustic device.

In the lower cover 1b, a ring 10 for preventing magnetism from leaking is adhered on the inside wall of the lower cover 1b and on the lower suspension spring 8b. Furthermore, a restriction ring 11 is secured to the inside wall of the ring as shown in FIG. 5. A pair of recesses 12 are formed in the restriction ring 11.

The supporting plate 4a of the pole piece 4 and the top plate 6 are adhered to the suspension springs 8a and 8b so that the vibrating assembly 3 is resiliently held in the cover 1.

In that condition, each of the stopper projections 4b is inserted in the recesses 12 as shown in FIG. 5. A voice coil 13 is secured to the underside of the diaphragm 2. The peripheral edge of the diaphragm 2 is adhered to the upper cover 1a, inserting the voice coil 13 in the gap between the pole piece 4 and the top plate 6.

In order to avoid a collision of the voice coil 13 with the supporting plate 4a of the pole piece 4, an annular groove 4d is formed on the supporting plate 4a.

When a signal current of an acoustic frequency is applied to the voice coil 13, the diaphragm 2 is vibrated to produce sounds. When a signal current having a low frequency is applied to the voice coil 13, the vibrating assembly 3 is vibrated.

When the frequency of the vibration of the vibrating assembly 3 does not coincide with a predetermined resonance frequency, the frequency of the vibrating assembly 3 is adjusted. More particularly, a mass adjusting adhesive in which metallic powders are included so as to increase a high specific gravity of the adhesive, or a weight is inserted in the lower cover 1b passing through the opening 1c and adhered to the wall of the recess 4c, while adjusting the quantity of the adhesive or weight.

Thus, an acoustic device having a desired function can be easily produced.

While the invention has been described in conjunction with preferred specific embodiment thereof, it will be understood that this description is intended to illustrate and not limit the scope of the invention, which is defined by the following claims.

What is claimed is:

1. A multifunction acoustic device comprising:

a cover;

a diaphragm mounted in the cover for producing sounds;

a vibrating assembly including a pole piece resiliently mounted in the cover adjacent the diaphragm so as to be vibrated;

a voice coil provided for vibrating the diaphragm;

a receiving portion formed on the vibrating assembly at a central portion thereof for receiving a mass adjusting material; and an opening provided in the cover allowing attachment of the mass adjusting material to the receiving portion of said multifunction acoustic device after assembly thereof.

2. The device according to claim 1 wherein the receiving portion is a recess formed in the pole piece.

3. The device according to claim 2 wherein the recess is formed in the underside of the pole piece.

4. The device according to claim 3 wherein the opening in the cover has corresponds to the recess.

5. The device according to claim 1, wherein the vibrating assembly further comprises a permanent magnet and a top piece.

* * * * *